Nov. 25, 1952 A. W. GORALSKE 2,618,857
APPARATUS FOR CUTTING GLASS
Filed Nov. 14, 1947 3 Sheets-Sheet 1

INVENTOR.
Arthur W. Goralske
BY
Nobbe & Swope
ATTORNEYS

INVENTOR.
Arthur W. Goralske
BY
Nobbe & Swope
ATTORNEYS

Nov. 25, 1952 — A. W. GORALSKE — 2,618,857
APPARATUS FOR CUTTING GLASS
Filed Nov. 14, 1947 — 3 Sheets-Sheet 3

INVENTOR.
Arthur W. Goralske
BY
Nobbe & Swope
ATTORNEYS

Patented Nov. 25, 1952

2,618,857

UNITED STATES PATENT OFFICE 2,618,857

APPARATUS FOR CUTTING GLASS

Arthur W. Goralske, Toledo, Ohio, assignor to Libbey-Owens-Ford Glass Company, Toledo, Ohio, a corporation of Ohio Application November 14, 1947, Serial No. 785,959

2 Claims. (Cl. 33—27)

The present invention relates to the art of glass cutting. More especially, it has to do with an improved method and apparatus for cutting sections of predetermined size and shape and especially circular sections from glass sheets or plates.

Heretofore it has been customary, in the cutting of circular sections, for example, to employ a trammel bar arrangement including a cutter mounted on the bar and a block or gripper cup which is pressed against the glass as the pivot point. With this type of device, the glass cutter is moved manually around the pivot point to scribe or score the circular cut. This has proved reasonably satisfactory for cutting relatively small circles, but it is slow, and in cutting larger circles it has been found difficult to swing the cutting tool in a wide arc while at the same time maintaining a desired amount of pressure to give a uniform cut.

It is an aim of this invention to provide a completely mechanical procedure for cutting sections of predetermined size and shape from glass sheets, by which cuts of a repetitively uniform size and similar depth of cut can be produced faster, more accurately and more efficiently than has heretofore been possible. To illustrate, it has already been found in actual commercial production that the device of this invention has doubled and in some cases tripled the production of even small circles, and it is expected that with more experienced operators, and on larger sizes, the increased output will be even greater.

Briefly stated, in the operation of my invention a glass sheet is placed upon an elevator platform after which the operator initiates an automatic work cycle. Immediately the glass sheet is raised into engagement with the cutter which is flexibly maintained in such relation. As the cutting engagement is established, the power for driving the cutter head is started and rotation of the head produces a circular cut in a uniform manner. When the cut nears completion, the speed of rotation is automatically reduced to offset any abruptness caused by stopping of the cutter head. Immediately following completion of the cutter head's rotation, the elevator platform descends and the glass sheet is removed by a helper while the operator loads a subsequent sheet. Since the operation of the cutting table is mechanically repetitive, any standards for size and quantity may be easily attained in an efficient manner while the lengthy and irregular procedure of manual cutting is entirely done away with.

An important object of the invention is the provision of a novel method of cutting sections of predetermined size and shape from glass sheets or plates which includes the steps of scoring the sheet at a relatively high speed over the major portion of the line of cut and of reducing the speed of scoring when the end of the score line is approached.

Another object is to provide an adjustably mounted cutting tool which will exert a resilient but positive pressure on the glass throughout the line of cut.

Another object of the invention resides in the provision of a rigid mounting connection between the cutter and the driving medium, said connection being capable of adjustment to cause movement of the cutter in paths of varying diameter.

A further object of the invention resides in the provision of an automatic control system for the cutting apparatus whereby glass sheets or plates will be elevated into a defined cutting zone, properly cut and subsequently lowered from said cutting zone for removal from the apparatus, the said system being adaptable to manual interruption of the automatic operation when and as found necessary or desirable.

Other objects and advantages of the invention will become more apparent during the course of the following description, when taken in connection with the accompanying drawings.

In the drawings, wherein like numerals are employed to designate like parts throughout the same:

Figure 1:
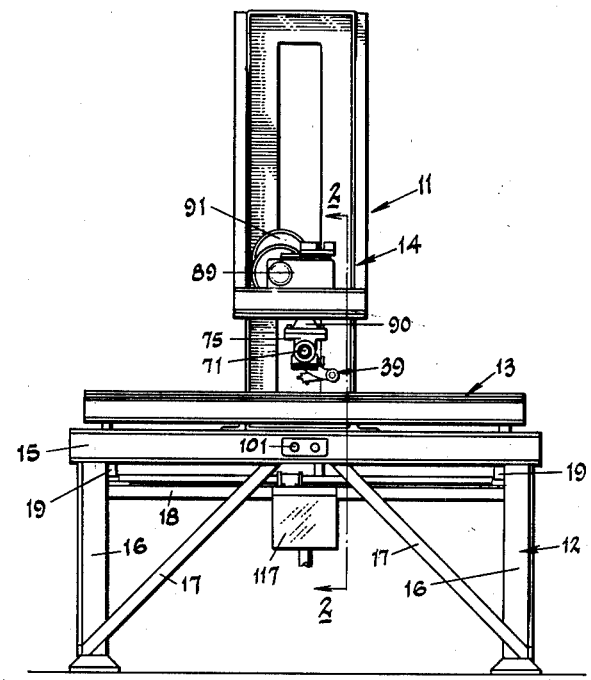
Fig. 1 is a front elevation of a cutting device as constructed in accordance with the present invention.
Figure 2:
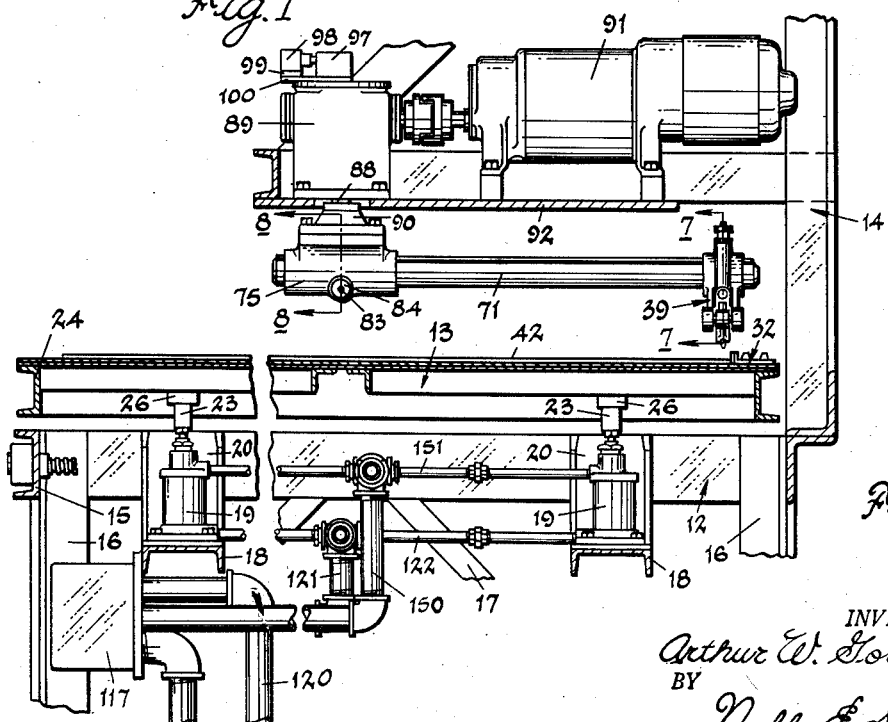
Fig. 2 is a vertical section as taken substantially on the line 2—2 in Fig. 1.
Figure 5:
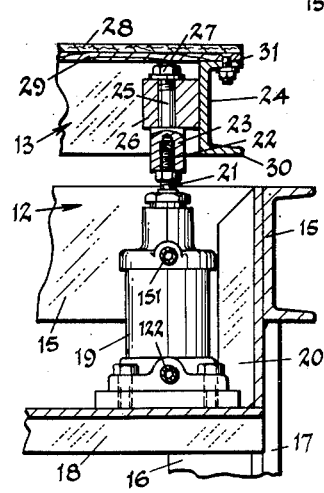
Fig. 5 is a detail sectional view of the elevating connection between the table parts.

Referring to the drawings and particularly to Figs. 1 and 2, it will be seen that the table, generally indicated at 11, comprises a base 12, a platform 13 and an overhanging frame 14. The base is formed of channel members 15 to provide a rectangular structure which is supported by legs 16 and bracing members 17. Extending transversely between the side channel members 15 are a pair of supporting channels 18 on which a series of cylinders 19 are mounted. The cylinders 19 are arranged in substantially the corner areas of the base 12 and beneath the platform 13 so that upon introduction of a pressure medium into either end of the cylinders, the platform will be elevated or lowered in a substantially level manner. As shown in Fig. 5, the channels 18 are located below the top surface of the channels 15 and are connected thereto by depending members 20; the members 20, the channels 18 and channels 15 being constructed to form the base 12 by welding, or other structural methods in any conventional manner.

Figure 3:
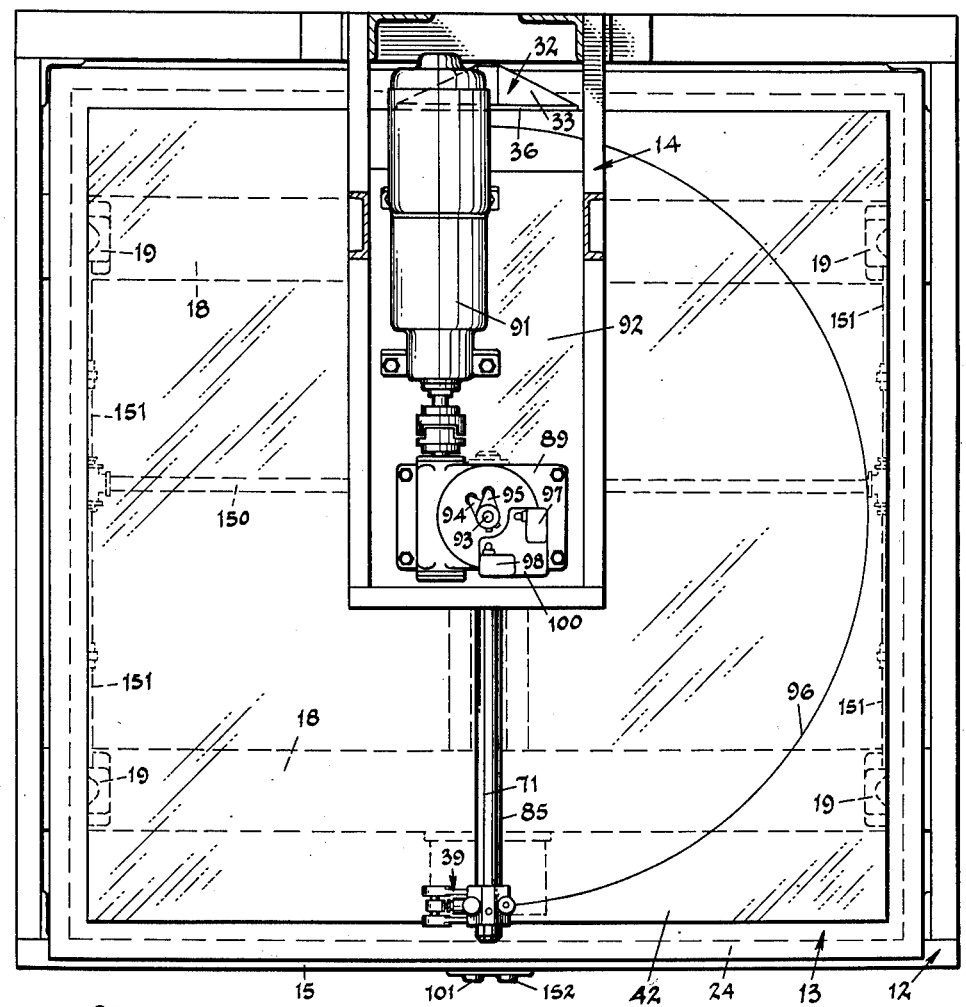
Fig. 3 is a plan view of the cutting table.

The cylinders 19 are located on the channels 18 in the corner areas of the base 12 formed by the channel members 15 as shown in Fig. 3. The rod 21 of each cylinder 19 is threaded, as at 22, to receive a connector fitting 23 by which the rod is mechanically united with the frame 24 of the platform 13. Preferably the connector fitting has an annular threaded portion 25 which is extended through a block 26, forming a part of the frame 24, and secured therein by a nut 27. The frame 24 is thus supported above the channel members 15 of the base 12 and is movable relative thereto in a substantially rigid manner.

The surface of the platform 13 is formed of a felt, or similar composition, layer 28 which is secured to a backing and supporting layer 29 of metal or wood material. Preferably the layer 29 is of composited plywood board of suitable thickness and is attached to the channels 30 of the frame 24 by nut and bolt connections 31. In the cutting device shown in the drawings, the frame 24 is of sufficient dimension to receive sheets of glass from which circular sections may be cut in diametric sizes from approximately 11 inches up to 48 inches in diameter. Obviously larger sizes of glass sheets or plates can be handled on cutting apparatus constructed for relatively increased sizes without departing from the spirit of the invention.

Figure 9:
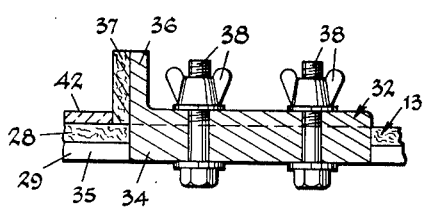
Fig. 9 is a fragmentary detail view of the glass sheet locator plate.

The glass sheet is loaded onto the felt layer 28 of the platform 13 and is maneuvered until centrally located or until one edge of the sheet contacts an aligning plate 32 which is carried by the platform adjacent the rear edge thereof. The plate 32 (Fig. 9) has a pad portion 33 resting on the surface of the felt layer 28 and also a depending, elongated rib 34 that interfits with the slot 35 provided in the layers 28 and 29. The slot 35 extends in the longitudinal axis of the platform so that the rib 34 will be restricted to movements paralleling the sides of the platform. Preferably, the aligning plate 32 has an upstanding rib 36 which is faced with a suitable cushioning material 37 for engagement of the glass without chippage or marring. The rib extends substantially at right angles to the rib 34 of the plate to receive the edge of the glass sheet and align the body thereof in the most desirable position for cutting. The plate is provided with a pair of bolts and wing nuts 38 so that the rib 34 can be slid along in the slot 35 and the plate locked in any of several locations in order that glass sheets of one size can be located on the platform in a rapid manner and assume the same position.

By location of the aligning plate 32, it will also be found possible to cut segments, other than complete circles, from portions, or areas, other than the central area of the sheet. In other words, where it is desirable to obtain a circular sector or circular segment, or multiples of the same, of a given radius, from a glass sheet, the sheet may be arranged on the platform 13 to produce a desired shape, with or without the use of the plate. However, repetitive accuracy will be maintained by its employment.

While loading the glass sheets, the platform 13 is supported sufficiently beneath the cutter head, generally indicated at 39, to prevent collision of the glass with steel cutter wheel 40 carried at its lower extremity. The relative elevations for loading and cutting of the glass may be seen in Fig. 7 wherein the line 41A indicates the top surface of the glass sheet 42 when the platform is at the loading elevation and the line 41B indicates the elevated position of the top surface of the glass sheet for cutting. Certain of the cutter head elements are also shown in phantom lines to represent the extent of movement afforded during the several positions of the platform.

Figures 6, 7:
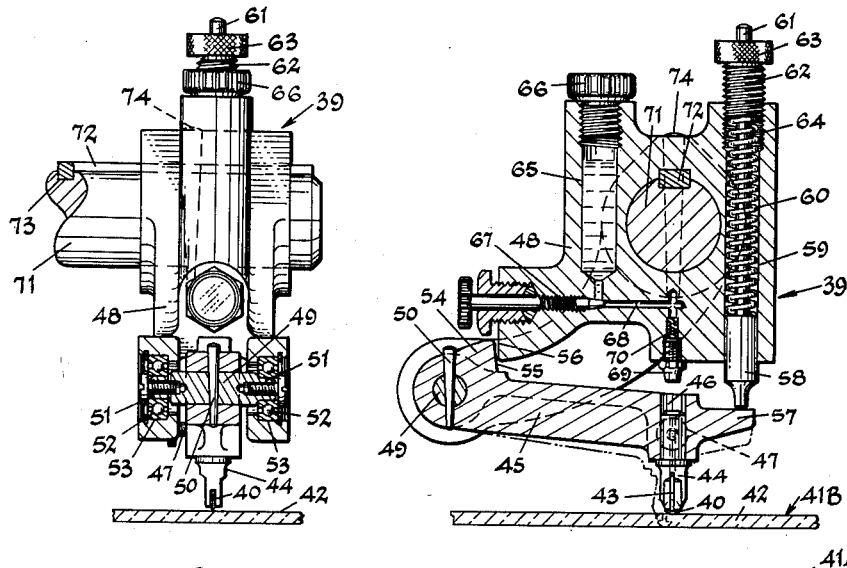
Fig. 6 is an end view of the cutter head, a part thereof being in section.
Fig. 7 is a section of the cutter head as taken substantially on the line 7—7 in Fig. 2.

The cutter wheel 40 which is of conventional design is carried in the usual manner on a U-shaped shaft 43 which is located in the grooved sides of a hollow rod 44. One end of the rod is mounted in an arm 45 having a passageway 46 for receiving the rod. Preferably the inserted end of the rod 44 is secured in the passageway 46 by a set screw 47. The arm 45 is pivotally mounted relative to the body 48 of the cutter head by a shaft 49 and secured thereto by a pin 50. As shown in Fig. 6, the shaft has reduced end portions 51 that are journaled in bearings 52 which are located in recessed portions 53 of the body 48. While freely rotatable, by reason of the bearings 52, the arm is restricted from movement in either direction within limits established to prevent dropping of the arm from the position shown by the phantom lines in Fig. 7; or to vary a predetermined position for the cutter wheel 40 when in contact with the glass as indicated by the position of the arm in full lines in Fig. 7. To prevent rotation of the arm 45 from its lowermost position, a boss 54 is provided on its upper surface, the face 55 of the boss engaging an abutment 56 formed by a portion of the body 48.

Upon elevation of the glass and contact of the cutter 40 with the top surface, the arm is swung upward until the free end 57 is arrested by a spring actuated plunger 58 from further motion. The plunger is located in a bore 59 formed in the body 48 and is movable therein under the compression of the spring 60. In the form of construction shown in the drawings and particularly Fig. 7, the plunger 58 has a stem 61 extending through the spring and into a threaded sleeve 62 by which the compression characteristics of the spring are modified. Preferably the sleeve has a knurled portion 63 for manipulation of the sleeve as it is turned in either direction within the threaded portion 64 of the bore 59. The spring will accordingly force the plunger outwardly within the restrictive limit of one direction and will establish, by reason of its compression load, the degree of pressure by which the cutter wheel 40 will be urged into cutting relation with the glass.

As a desirable accessory to satisfactory glass cutting, a quantity of oil, usually kerosene, is supplied to the wheel from a reservoir formed in the body 48. The reservoir 65, which may be closed by a plug 66, communicates with a needle valve 67 that controls the fluid flow into the passageway 68 and threaded sleeve member 69. The member 69 receives the fluid as it passes a wick or fabric plug 70 so that the fluid leaves the fitting in a slow drop formation. The sleeve member 69 is located above the passageway 46 in the arm 45 to direct the flow toward the hollow rod 44 and onto the cutter wheel 40.

Figure 8:
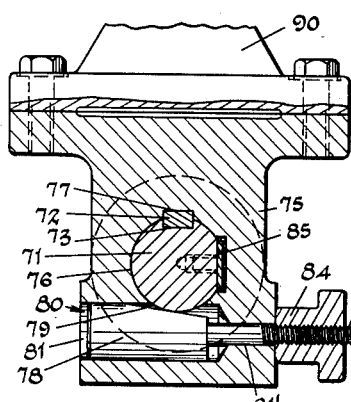
Fig. 8 is a section of the mounting bar and of the locking means therefor, the view being taken substantially on the line 8—8 in Fig. 2.

The body of the cutter head 39 is carried by a mounting bar 71 that is secured at its opposite end to a source of rotary power. The body portion 48 is secured from angular movement by the provision of a key 72 which extends the length of the bar in a keyway 73 and from endwise movement on the bar by a pin 74. The cutter head thus becomes substantially an integral part of the bar 71 and, except in cases of removal for repair or substitution, has no unrelated movement. The bar 71 is mounted in its opposite end in a block 75 having a bore 76 for receiving the bar. The key 73 interfits with a way 77 formed in the block to maintain the angular relation between the several parts while the bar is shifted with respect to the block or rigidly secured to it. The securing relation is effected by a plug 78 having a cam surface 79 formed thereon. The plug is located in a bore 80 extending at right angles to the bore 76 in the block 75. The bore 80, as shown in Fig 8, forms a chamber 81 in which the plug 78 is positioned and a passageway 81' of smaller diameter through which the stem 82 of the plug extends. The stem has an outwardly extending threaded end 83 by means of which the major body portion of the plug may be moved relative to the bar 71 upon turning of a hand nut 84 against the block. As the plug is drawn inwardly by the nut 84, its cam surface 79 will bear against the bar to frictionally clamp the bar against the walls of the bore 76 in the block.

Figure 4:
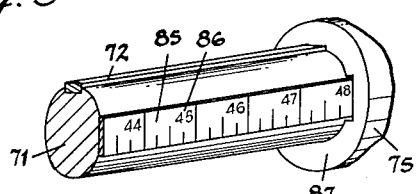
Fig. 4 is a perspective view of the cutting mounting bar and the indicator scale.

The bar is thus rigidly clamped within the block except for sliding movements thereof to increase or decrease the size of circle to be scribed or cut in the glass sheet. In order to determine the length of radius or rotation of the cutter head, the bar has a scale 85 mounted on one side which is suitably provided with a flatted surface for receiving the scale. The legend indications 86 on the scale are computed in the desired diameter of the circular section to be produced. As seen in Fig. 4, one face of the block, as at 87, is used as a guide edge in establishing the desired diameter, it being understood that the distance from the cutter wheel 40 to the vertical axis of the block 75 is half of the indicated diameter, or the true radius of the circle. Also that the distance from the face 87 of the block 75 to the cutter wheel 41 is not half of the denoted diameter.

The block 75 is located concentrically with the drive shaft 88 of a gear reduction unit 89 and is connected thereto by means of a suitably formed member 90. The unit 89 is driven by a variable speed controlled motor 91, the unit and the motor being mounted on a plate 92 carried by the overhanging frame 14. The opposite end 93 of the shaft 88 extends from the opposite end of the unit 89 and has secured thereon a pair of switch controlling cams 94 and 95 (Fig. 3) whose function will be subsequently described in their relation to the operation of the motor 91.

In producing a circular sector, segment or completely round section from a glass sheet or plate, or a multiplicity of similar sections having the same radius or diameter, the bar 71 and head 39 are also brought into the location illustrated in Fig. 3 for shifting the bar relative to the block 75 until the desired inch dimension or diameter has been determined by the legends 86 on the scale 85, after which the bar is rotated until it has completed a revolution. A sheet, such as the glass sheet 42, is then placed upon the platform 13 and located so that one edge contacts the previously positioned aligning plate 32. Having determined the stock size of the sheet and the required radius or diameter of circular section, the plate 32 is located to assure that the sheets in contacting the cushion surface 37, will allow a salvage margin between the adjacent edge of each sheet and the cut to be made. During loading of a sheet, the mounting bar 71 and cutter head 39 extend diametrically away from the working side of the table which would be the left hand side as viewed in Fig. 2. When the sheet has been most advantageously located, the operator depresses a switch button to initiate the automatic cycle of the operation which comprises raising of the platform 13 from the elevation indicated at 41A (Fig. 7) to the elevation indicated at 41B. Concurrent with the arrival of the glass in engagement with the cutter wheel 40, the motor 91 is started and, through the reduction unit 89, the bar 71 carries the cutter head 39 in a circular path having a diameter of desired size. In Fig. 3, the cut formed in the glass sheet is indicated at 96, while the bar 71 and head 39 are illustrated at the half way point of their travel. To maintain a regularity of operation and to produce the cut 96 in an efficient manner, the cutter head 39 and bar 71 are revolved at a high rate of speed during the major portion of their rotation and means is provided by one of the control members for materially reducing the motor speed as the end of the cut is approached. Any suddenness of stopping which might tend to develop a shock to the cutter or the glass is thus obviated.

As the completion of the circle is approached, the control cam 94 actuates a switch 97 to reduce the speed of the motor while the control cam 95 actuates a switch 98 to halt the motor upon delivery of the cutter head to the starting point. The control cam 95 is carried on the shaft 88 above the control cam 94 so that it will actuate only the switch 98 which is elevated by a spacer bar 99 above the surface of the plate 100 on which the switches 97 and 98 are mounted. The plate 100 is attached to the top of the reduction unit 89 in any suitable manner. The switch 98 also causes reversal of the supply of pressure to the cylinders 19 so that the platform immediately descends and the cut sheet may be removed for breaking.

Figure 10:
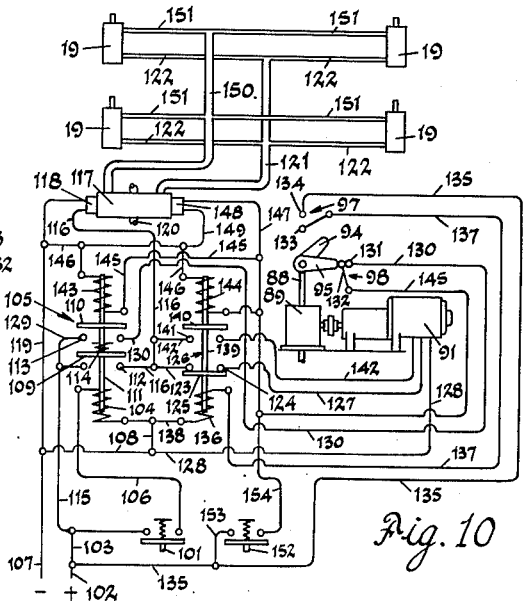
Fig. 10 is a diagrammatic representation of the combined pneumatic and electric systems for operating the component parts of the cutting table.

In Fig. 10, the above described elements are shown and also a conventional diagrammatic system of interlocking controls by which the elements may produce the several sequential functions in their order successively and substantially without interruption. The starter switch 101 is connected to a source of electrical energy 102 by the line 103. The switch 101 is of the momentary closure type and when closed completes a circuit for the coil 104 of a relay switch 105 from the electrical source 102 by the line 103 through the switch 101 and line 106 and from the coil 104 to the return 107 by a line 108. When energized, the coil 104 moves the contacts 109 and 110 on the switch armature 111 into engagement with fixed contacts 112 and 113 respectively. Preferably, the contact 110 makes engagement with the contacts 113 after a short interval which follows closure of the contacts 109 and 112. This interval may be produced as by a spring 114 acting upon the contact 109 in any well known manner and the purpose thereof will be described hereinafter. The contacts 109 and 112 complete a circuit from the source 102 and line 103 by lines 115 and 116 to a solenoid actuated valve 117. One solenoid of the valve, as indicated at 118, is connected to the return 107 by lines 119. When energized, the solenoid 118 causes connection of the pneumatic supply pipe 120 to a distributor pipe 121 having branch pipes 122 extending to each of cylinders 19 at their lower end. Introduction of pressure into the cylinders raises the piston rods 21 to lift the platform 13.

A branch line 123 from the line 116 extends through the closed contacts 124 and 125 of a relay switch 126 and by a line 127 to one side of the motor 91. The motor circuit is thus completed from the source 102 by the line 115, contacts 109 and 112, lines 116 and 123, contacts 124 and 125 and line 127; the motor return being by the lines 128 and 108 to the return side 107 of the electrical source.

In the figure it will be seen that the cam 95 is holding the switch 98 in closed position; however, the supply circuit to the switch is open (as shown) at the contacts 110 and 113. The circuit when completed, extends from the supply branch 115, the line 129, the contacts 110 and 113 and line 130 to the contact 131 of the switch 98. Continued closure of the movable contact 132 of the switch by the cam 95 will not therefore, at the initiation of operation, cause performance of any sequential function. Thus, as the motor drives the reduction unit 89, the shaft 88 thereof will remove the cam 95 from the switch 98 before the contacts 110 and 113 complete the above described circuit. As previously set forth, the contacts 109 and 110 are carried by the switch armature 111, the contact 109 being resiliently backed by the spring 114 so that, having moved the contact 109 into engagement with the fixed contacts 112, an interval of delay will be created while the armature is still moving and before the contact 110 engages the fixed contacts 113.

Operation of the motor 91 continues at the set high speed rating until the cam 94 actuates the movable contact 133 of the switch 97 and causes engagement of the contact 133 and the fixed contact 134 of the switch. The contact 134 is connected by a line 135 to the source 102 and by the contact 133 of the switch, to a coil 136 through line 137, the circuit being completed by line 138 to the line 108 and the return 107. The coil 136 actuates the armature 139 of the relay switch 126 to open the contacts 124 and 125 and close contacts 140 and 141. The contacts 140 and 141 complete a branch line 142 from the closed circuit line 116 to the winding of the motor 91 to reduce the speed rating in a manner well known in the art. A spacing of 45° is shown between the cams 94 and 95 although it is to be appreciated that variations may be made in the spacing according to the length of period desired for operation of the motor at a high rate of speed followed by reduction to a slower rate of speed and before the motor stops. Upon completion of the cut, reclosure of the movable contact 132 and the contact 131 of the switch 98 by the cam 95 completes parallel circuits to the coils 143 and 144 of the relay switches 105 and 126 respectively by a line 145 from the supply branch 130. The coil circuits are completed to the return 107 by the line 146 and lines 119 and 108.

The coils 143 and 144 reverse the positions of the armatures 111 and 139 of the switches 105 and 126 and accordingly open the circuits to the motor 91 and solenoid 118 of the valve 117 between the source 102 through the lines 103, 106, 116, 123 and 127. The motor is preferably of the enclosed brake type so that when its service circuits are opened, the power driving force is immediately halted. The line 145 is also connected by a branch 147 to the solenoid 148 of the valve 117 at the end opposite the solenoid 118. The circuit of the solenoid is completed to the return 107 by the lines 149 and 146 to the branch return 119. When the motor stops and the cutter head 39 is returned to its starting point upon completion of the circular cut line 96, the platform 13 will descend as the valve 117 is reversed. The supply pipe 120 is now connected to the upper ends of the cylinders 19 through the distributor pipe 150 and branch pipes 151.

The automatically arranged sequence of operation may be terminated when necessary by closure of the switch 152. The contacts of the switch complete a circuit from the current source 102 by the lines 135 and 153 to a line 154 which connects to the line 145 and establishes the circuit to the coils 143 and 144 to produce reversal of the switches 105 and 126 as above described.

When the armature 111 of the relay switch 105 is reversed, the contacts 109 and 110 open their respective circuits; the contacts 109 and 112 opening the circuits to the lines 116 and 123 to the valve 117 and motor 91, while at the contacts 110 and 113, the continued closure of the switch 98 is ineffectual to actuate the elements of its control circuit. The armature 139 of the relay switch 126 resets the speed rating circuits of the motor 91 so that, upon resumption of operation, the higher speed rating will be established as desired. The various operations of the apparatus are thus capable of successive performance in substantially uninterrupted sequence.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In a device for cutting circular sections from glass sheets, a support for the sheet to be cut; a cutting head mounted on a swinging arm over said support for movement in a circular path in the horizontal plane and including a cutting tool mounted on a pivoted arm for swinging vertical movement toward and away from the support, means contacting one end of said pivoted arm for limiting the vertical movement of said tool, and means contacting the opposite end of said pivoted arm for resiliently urging said tool downwardly; means for slidably adjusting the position of said swinging arm to vary the diameter of said circular path; means for positioning the sheet to be cut on said support and in alignment with the path of circular movement of the cutting head thereabove; hydraulic means for raising the support to bring the sheet carried thereby into operative engagement with said cutting tool; a motor for initially moving said swinging arm to move the cutting head along a circular path to cut the sheet at a relatively high rate of speed; means for reducing the motor speed to reduce the speed of movement of the swinging arm before the cutting head reaches the end of its travel along said circular path; means for stopping the motor to stop the movement of said swinging arm when the cutting head completes its travel along said path; hydraulic means for lowering said support to remove the sheet supported thereon from operative engagement with the cutting tool at the conclusion of the cutting operation; and electrical control means for actuating said first-mentioned hydraulic means, the means for swinging said arm, the means for stopping the swinging movement of said arm, and the second-mentioned hydraulic means, successively and in substantially uninterrupted sequence.

2. In a device for cutting circular sections from glass sheets, a support for the sheet to be cut, a vertical drive shaft mounted for rotation above said support, a block mounted at the end of said shaft and having a horizontally arranged passageway extending therethrough, a swinging rod having an end thereof received in said passageway, a cutting head mounted at the opposite end of said rod for movement in a circular horizontal path over said support and including an arm pivoted thereto at one end for vertical swinging movement toward and away from the support, means for resiliently urging the free end of said arm downwardly, means at the pivoted end of said arm adapted to engage an abutment on said cutting head for limiting the extent of downward movement of the free end of said arm, a cutting tool mounted in the free end of said arm, a scale carried on one face of said rod for indicating the diameter of a circle to be cut when said rod is adjusted within said passageway to vary the diameter of said circular path, means for positioning the sheet to be cut on said support and in alignment with the path of circular movement of the cutting head thereabove, means for raising said support to bring the sheet carried thereby into operative engagement with said cutting tool, a motor having driving connection with said vertical drive shaft, means for starting said motor at a relatively high speed to initially swing said rod to move the cutting head along a circular path with the cutting tool in engagement with said sheet at such speed, means for subsequently reducing the speed of said motor to reduce the speed of swinging of the arm before the cutting head reaches the end of its travel along said circular path, means for stopping the motor to stop the swinging movement of said arm when the cutting head completes its travel along said path, and means for lowering said support to remove the sheet supported thereon from operative engagement with the cutting tool at the conclusion of the cutting operation.

ARTHUR W. GORALSKE.

REFERENCES CITED

The following references are of record in the file of this patent:

UNITED STATES PATENTS

| Number | Name | Date |
| --- | --- | --- |
| 1,204,039 | Lindeburg | Nov. 7, 1916 |
| 1,214,295 | Gammeter | Jan. 30, 1917 |
| 1,402,961 | Ratcliff | Jan. 10, 1922 |
| 1,421,921 | Doerr | July 4, 1922 |
| 1,530,377 | Lamberton | Mar. 17, 1925 |
| 1,999,594 | Owen | Apr. 30, 1935 |
| 2,044,577 | Klages | June 16, 1936 |
| 2,118,170 | Crowley et al. | May 24, 1938 |
| 2,230,651 | Morris | Feb. 4, 1941 |
| 2,322,336 | Anderson | June 22, 1943 |